United States Patent
Kim et al.

(10) Patent No.: US 6,904,487 B2
(45) Date of Patent: Jun. 7, 2005

(54) APPARATUS AND METHOD FOR GENERATING DISTRIBUTED TRAFFIC

(75) Inventors: Jae-hwa Kim, Siheung-si (KR); Il-ju Na, Anyang-si (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 274 days.

(21) Appl. No.: 10/356,716

(22) Filed: Feb. 3, 2003

(65) Prior Publication Data

US 2004/0039864 A1 Feb. 26, 2004

(30) Foreign Application Priority Data

Jun. 11, 2002 (KR) .................................. 10-2002-0032523

(51) Int. Cl.⁷ .......................... G06F 13/00; G06F 13/14
(52) U.S. Cl. ...................... 710/305; 710/100; 370/257; 709/253
(58) Field of Search ................................. 710/305, 104, 710/100; 370/464, 475, 257, 254; 713/100; 709/227, 245, 253

(56) References Cited

U.S. PATENT DOCUMENTS

| | | | |
|---|---|---|---|
| 6,512,767 B1 * | 1/2003 | Takeda et al. ............... | 370/389 |
| 6,735,619 B1 * | 5/2004 | Sawada ....................... | 709/212 |
| 6,754,184 B2 * | 6/2004 | Miyano et al. ............. | 370/257 |
| 6,816,967 B1 * | 11/2004 | Iijima et al. ................ | 713/164 |

FOREIGN PATENT DOCUMENTS

| JP | 10-290237 A | 10/1998 |
|---|---|---|
| KR | 10-2001-0018994 A | 3/2001 |

OTHER PUBLICATIONS

"Testing CPU based boards for functionality using bus cycle signature system" by Sabapathi, S.R. (abstract only) Publication Date: Dec. 2–4, 1998 Singapore.*

* cited by examiner

*Primary Examiner*—Gopal C. Ray
(74) *Attorney, Agent, or Firm*—Sughrue Mion, PLLC

(57) ABSTRACT

An apparatus and method for generating distributed traffic in nodes coupled to a bus, wherein one node reads information on other nodes and generates traffic, includes a bus interface unit and a control unit receiving signals. The signals are transmitted from the nodes via the bus interface unit, to detect a bus reset and determine the number N of nodes coupled to the bus and a node ID number K of a node having the control unit. The information on the nodes is read in a predetermined order, starting from a reference node with node ID number K+M, wherein M is an integer larger than 1−K and smaller than N−K. The apparatus controls the order of generation of read transactions in each node for reading information from the other nodes coupled to a bus. The traffic load applied to each node is distributed to reduce an initial bus stabilization time.

15 Claims, 5 Drawing Sheets

APPARATUS AND METHOD FOR GENERATING DISTRIBUTED TRAFFIC

BACKGROUND OF THE INVENTION

This application claims the priority of Korean Patent Application No. 2002-32523, filed Jun. 11, 2002 in the Korean Intellectual Property Office, the contents of which is incorporated herein in its entirety by reference.

1. Field of the Invention

The present invention relates to the generation of traffic in nodes coupled to a bus, and more particularly, to an apparatus and a method for generating distributed traffic in nodes coupled to a bus that supports hot plugging.

2. Description of the Related Art

Hot plugging is a method for connecting a node to a bus that does not require a complex identification process so that the node can be used immediately after being connected to the bus. To this end, a read transaction, by which a node accesses the other nodes connected to a bus and reads information on the other nodes from configuration ROMs of the other nodes, is necessary. Buses that support hot plugging include an IEEE 1394 bus, which is a digital interface standard for transmitting and receiving data between digital multimedia devices in real time.

Since the IEEE 1394 bus transmits data at a high speed, the IEEE 1394 bus processes real time data and asynchronous data simultaneously. In addition, according to the IEEE 1394 standard, low speed equipment and high-speed equipment may be used in the same network environment, so that the IEEE 1394 standard can comprehensively connect electronic home appliances, computers, and peripheral devices. Applications using the IEEE 1394 standard include the construction of home multimedia, and the production of a video having broadcast image quality by using a personal computer.

In the related art, a node denotes a device connected to a bus, and performs hot plugging. The node may be a complete product, such as a camcorder, or a component installed in a complete product.

When a bus reset occurs due to the connection of a new node to a conventional bus configured for hot plugging, each node connected to the bus tries to read information from the configuration ROMs of the other nodes and identify information on the other nodes according to a fixed order, as described with reference to FIGS. 1 and 2.

FIG. 1 is a block diagram illustrating nodes connected to a bus that supplies hot plugging in the related art. Here, N nodes (i.e., a first node 110 through an $N^{th}$ node 170) are connected to a bus 180.

FIG. 2 illustrates the generation of a read transaction in which each node reads information on the other nodes in response to a bus reset. Here, four nodes (i.e., a first node 110 through a fourth node 140) are illustrated. When a bus reset occurs, each node tries to read information on the other nodes within a bus according to a fixed order so that read transactions are generated in the order of the node ID numbers (i.e., 1, 2, 3, . . . , N). Accordingly, as shown in FIG. 2, the second node 120 through the fourth node 140 try to read information on the first node 110. Thereafter, the first, third and fourth nodes 110, 130, and 140, respectively, try to read information on the second node 120. The nodes access the other nodes according to the fixed order, thereby generating traffic in the bus.

Therefore, every node accesses all of the other nodes in the order of the node ID numbers, so that traffic is concentrated on one node at an initial state of a bus reset, which causes serious delay in processing the nodes. After the delay in processing one node is resolved, the traffic is concentrated on the next node. Accordingly, the bus becomes stable and application operations can be performed only after the traffic has been concentrated on every node.

SUMMARY OF THE INVENTION

To solve the above-described problems, it is an objective of the present invention to provide an apparatus and a method for generating distributed traffic to reduce an initial stabilization time of a bus. To this end, in an initial state of a bus reset, the traffic load applied to each node is distributed by adjusting the order of accessing the nodes coupled to the bus to read information on the other nodes.

To accomplish the objective of the present invention, an apparatus for generating traffic in nodes is provided, wherein a plurality of nodes are coupled to a bus and one node reads information on the other nodes and generates traffic, the apparatus includes a bus interface unit for interfacing with the bus and a control unit receiving signals, which are transmitted from a plurality of nodes coupled to the bus, via the bus interface unit to detect a bus reset and determine the number N of nodes coupled to the bus and a node ID number K of a node having the control unit, and reading the information on the nodes in a predetermined order starting from a reference node having the node ID number K+M, wherein M is an integer larger than 1−K and smaller than N−K.

It is preferable that the apparatus for generating traffic further includes a storage unit for storing ID information on the node. It is preferable that the predetermined order is an ascending order of the node ID numbers or a descending order of the node ID numbers.

To accomplish the objective of the present invention, a method for generating traffic in a node is provided, wherein a plurality of nodes are coupled to a bus and one node reads information on the other nodes and generates traffic, the method comprises (a) detecting a bus reset, (b) determining the number N of nodes coupled to the bus and the node ID number K of the node, and (c) reading information on the other nodes according to a predetermined order starting from a reference node having a node ID number K+M, wherein M is an integer larger than 1−K and smaller than N−K.

It preferable that the information of (c) is ID information on the nodes. It is preferable that the predetermined order of (c) is an ascending order of the node ID numbers or a descending order of the node ID numbers.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 3:
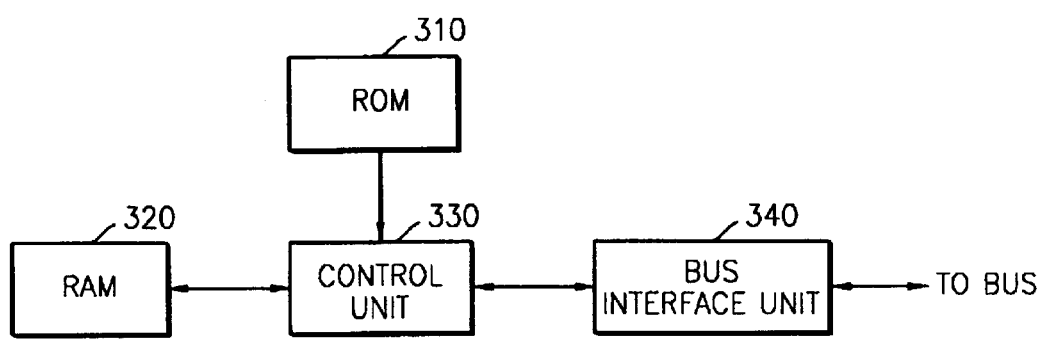
FIG. 3 is a block diagram illustrating an apparatus for generating distributed traffic according to a non-limiting, exemplary embodiment of the present invention.

FIG. 3 is a block diagram illustrating an apparatus for generating distributed traffic according to an embodiment of the present invention, including a ROM 310, a RAM 320, a control unit 330, and a bus interface 340 coupled to the bus. The ROM 310 is a configuration ROM that stores node ID information, such as a globally unique identifier (GUID), the manufacturer of the node, the capability of a bus, and the kinds of upper layer protocols supported by the bus.

The RAM 320 stores application programs for interfacing in order to perform programs in the control unit 330, and the bus interface unit 340 interfaces with the bus. The control unit 330 receives signals transmitted from a plurality of nodes coupled to the bus via the bus interface unit 340, to detect a bus reset and determine the number N of nodes coupled to the bus and the node ID number K of a node, which includes the control unit 330. Therefore, the control unit 330 reads information on the other nodes in a predetermined order starting from a reference node having a node ID number of K+M, wherein M is an integer larger than 1−K and smaller than N−K. The control unit 330 can be realized as a CPU or a microcomputer depending on which type of node it is.

The operation of the control unit 330 will now be described in detail. When a new node is coupled to a bus or a node is removed from the bus, an electrical signal transmitted from the node to the bus is generated or eliminated, respectively. This occurrence is referred to as a bus reset. A control unit 330 detects a bus reset state in response to the generation or elimination of the electrical signal of the particular node.

When a bus reset occurs, every node coupled to the bus transmits self-ID packets having basic information, including (but not limited to) the node ID numbers to the bus. Thereafter, the control unit 330 receives the self-ID packets to determine the number N of nodes coupled to the bus, including the node having the control unit 330 and the node ID number K of the node having the control unit 330.

The control unit 330 accesses the other nodes to generate a read transaction for reading information stored in the configuration ROMs of the other nodes. Here, the control unit 330 accesses the other nodes in a predetermined order, for example, but not by way of limitation, in an ascending order or a descending order, starting from a reference node having a node ID number K+M, wherein M is an integer larger than 1−K and smaller than N−K. However, the order in which the nodes are accessed to generate read transactions is not limited to the above order. Any order in which the read transactions are prevented from concentrating on one node is acceptable.

As described above, when each node generates read transactions in an order from the nodes having node ID numbers larger or smaller than each node ID number by a predetermined number, the traffic is not concentrated on one node so that a serious delay in processing the nodes is prevented.

Figure 4:
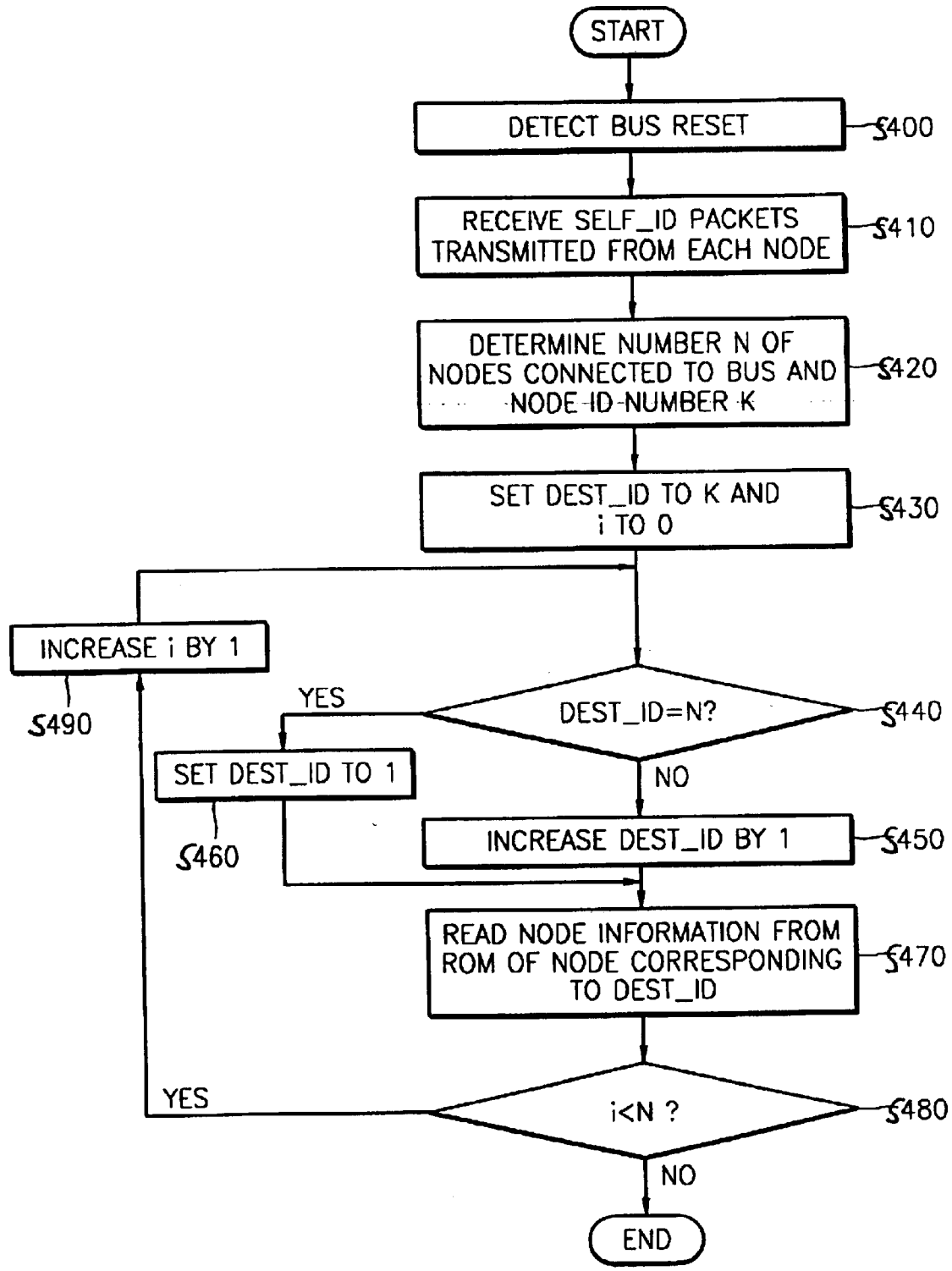
FIG. 4 is a flowchart illustrating a method for generating distributed traffic according to the non-limiting, exemplary embodiment of the present invention.

FIG. 4 is a flowchart illustrating an embodiment of a method for generating distributed traffic according to the present invention. First, the control unit 330 receives signals, which are transmitted from a plurality of nodes coupled to a bus, via the bus interface unit 340 to detect a bus reset in step S400.

When a bus reset occurs, the control unit 330 receives self-ID packets having basic information including node ID numbers, which are transmitted from every node coupled to the bus, via the bus interface unit 340 in step S410. As step S420, the control unit 330 determines the number N of the nodes coupled to the bus, including the node having the control unit 330 and a node ID number K of the node having the control unit 330.

Thereafter, the control unit 330 sets a variable Dest_ID to the node ID number K of the node having the control unit 330 and a variable i to 0 in step S430. The control unit 330 determines whether the variable Dest_ID is the same as the number N of nodes in step S440.

When Dest_ID is different from the number N of nodes, the variable Dest_ID is increased by one in step S450. Although the variable Dest_ID is increased by one in the present embodiment, the variable Dest_ID may be increased by M, wherein M is an integer larger than 1−K and smaller than N−K.

Thereafter, if the variable Dest_ID is the same as the number N of nodes, the variable Dest_ID is set to 1 in step S460. After either step S450 or S460 occurs as described above and illustrated in FIG. 4, the control unit 330 reads ID information from the configuration ROM of the node corresponding to the variable Dest_ID in step S470. Thereafter, the control unit 330 determines whether the variable i is smaller than the number N of nodes in step S480.

If the variable i is smaller than the number N of nodes, the variable i is increased by 1 in step S490, and then step S440 is performed again. Therefore, steps S440 through S480 are repeated until the variable i becomes the same as the number N of nodes to read the ID information from the configuration ROM of each node coupled to the bus. Although the variable i is increased by 1 in the present embodiment, alternatively, the variable i may be increased by (−1) as long as the read transactions are prevented from concentrating on one node.

Figure 5:
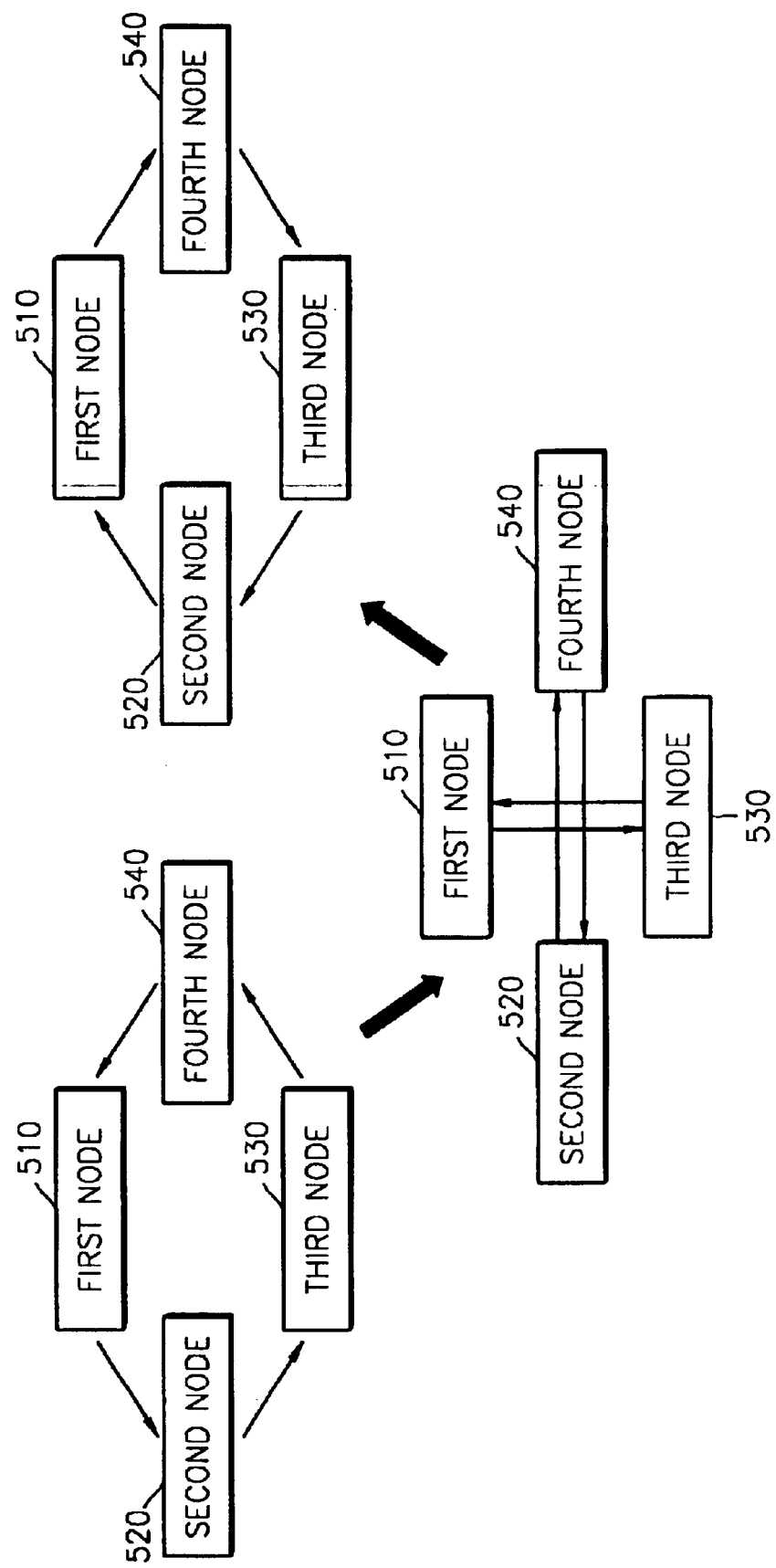
FIG. 5 illustrates the generation of read transactions in each node according to the non-limiting, exemplary embodiment of the present invention.

FIG. 5 illustrates the generation of read transactions in each node according to an exemplary, non-limiting embodiment of the present invention. Here, the present invention includes first through fourth nodes 510, 520, 530, and 540, respectively, and generates read transactions in an ascending order starting from the nodes having node ID numbers larger than each node ID number by 1.

When a bus reset occurs, the first node 510 generates a read transaction in the second node 520. Thereafter, the first node 510 generates read transactions in the third node 530 and the fourth node 540, respectively. When the bus reset occurs, the second node 520 generates a read transaction in the third node 530. Thereafter, the second node 520 generates read transactions in the fourth node 540 and the first node 510, respectively.

Figure 1:
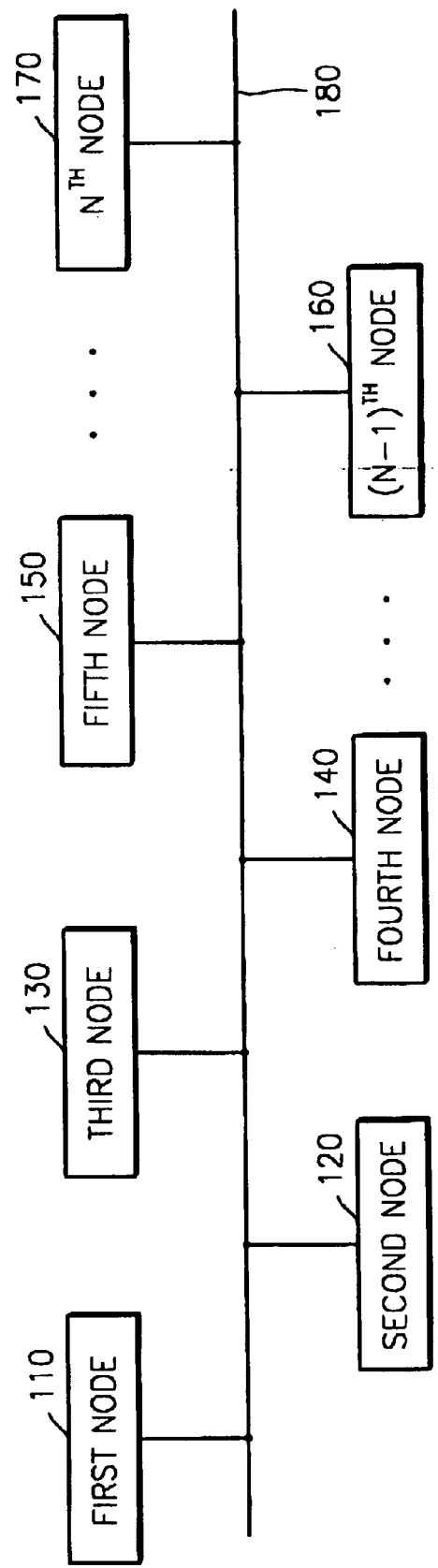
FIG. 1 is a related art block diagram illustrating nodes connected to a bus.
Figure 2:
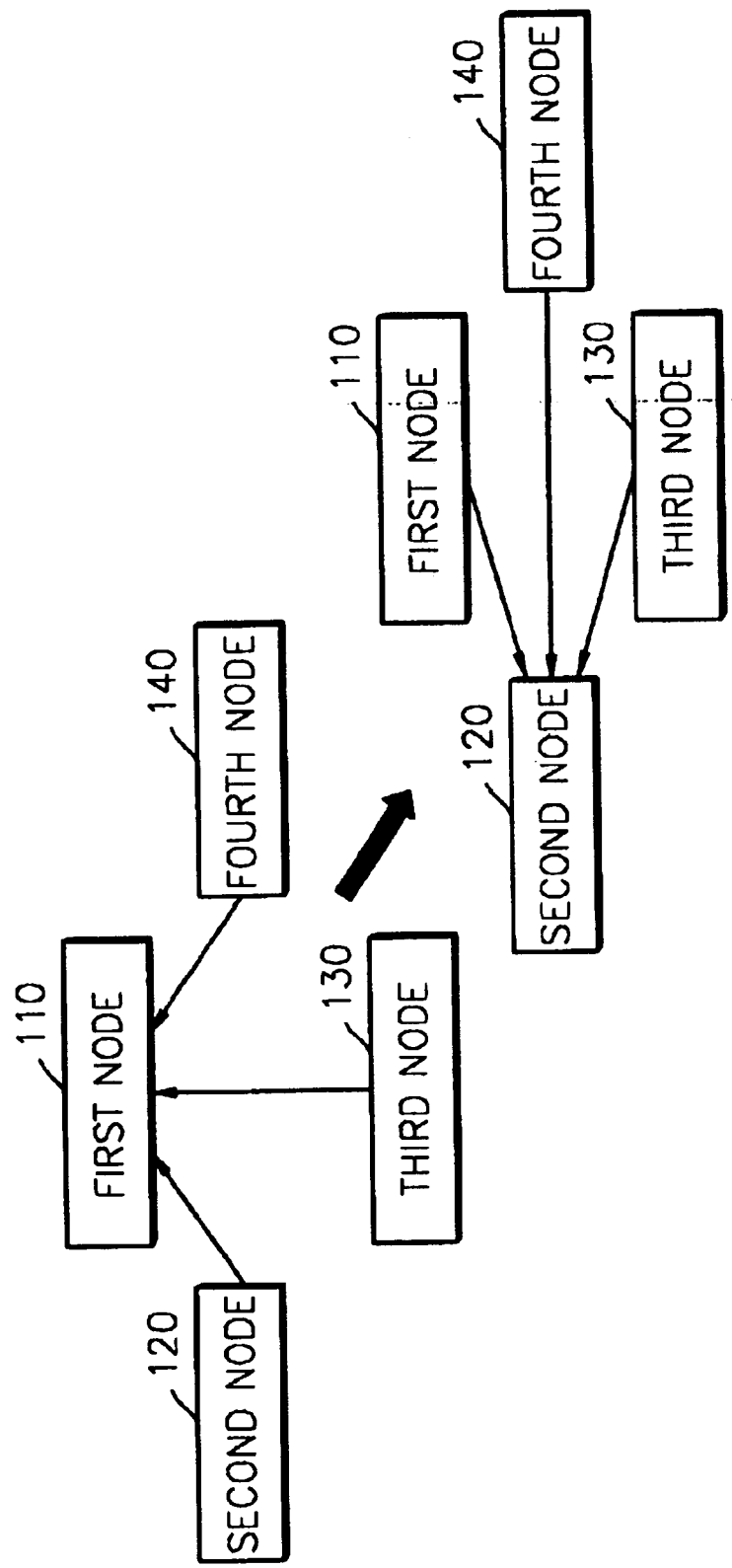
FIG. 2 illustrates the related art generation of read transactions in which each node reads information on the other nodes according to a bus reset.

Accordingly, one read transaction is generated in each node so that the traffic load is reduced compared to conventional read transactions of FIG. 2, where three read transactions are generated in each node.

The present invention can be realized as a code on a recording medium, which can be read out by a computer. Here, the recording medium includes any kind of recording device in which data are recorded, such as a ROM, a RAM, a CD-ROM, a magnetic tape, a hard disk, a floppy disk, a flash memory, and an optical data recording device, while further including a carrier wave (i.e., transmission over the Internet). In addition, the recording media read out by a computer are distributed to computer systems coupled by a network to record and execute codes, which can be read out by a computer, in a distribution manner.

As described above, an apparatus and a method for generating distributed traffic according to the present invention prevent delays in processing nodes due to concentration of traffic on one node at the initial state of a bus reset. Here, the present invention controls the order of generation of read transactions in each node for reading information from the other nodes coupled to a bus. Therefore, the traffic load applied to each node is distributed in order to reduce an initial stabilization time of a bus.

It will be apparent to those skilled in the art that various modifications and variations can be made to the described illustrative, non-limiting embodiments of the present invention without departing from the spirit or scope of the invention. For example, but not by way of limitation, the nodes may be connected to each other and/or the bus. Thus, it is intended that the present invention cover all modifications and variations of this invention consistent with the scope of the appended claims and their equivalents.

What is claimed is:

1. An apparatus for generating traffic in nodes, wherein a plurality of nodes are coupled to a bus and one node reads information on the other nodes and generates traffic, comprising:
   a bus interface unit interfacing with the bus; and
   a control unit receiving signals transmitted from said plurality of nodes coupled to the bus, via the bus interface unit to detect a bus reset and determine a number N of nodes coupled to the bus and a node ID number K of a node having the control unit, said control unit reading the information on the nodes in a predetermined order starting from a reference node having the node ID number K+M, wherein M is an integer larger than 1−K and smaller than N−K.

2. The apparatus for generating traffic of claim 1, wherein the number N of nodes is determined by counting received ID packets transmitted from each node coupled to the bus.

3. The apparatus for generating traffic of claim 1, further comprising a storage unit for storing ID information on the one node.

4. The apparatus for generating traffic of claim 1, wherein the predetermined order is an ascending order of the node ID numbers.

5. The apparatus for generating traffic of claim 1, wherein the predetermined order is a descending order of the node ID numbers.

6. A method for generating traffic in a node, wherein a plurality of nodes are coupled to a bus and one node reads information on the other nodes and generates traffic, the comprising the steps of:
   (a) detecting a bus reset;
   (b) determining a number N of nodes coupled to the bus and a node ID number K of the node; and
   (c) reading information on the other nodes according to a predetermined order starting from a reference node having a node ID number K+M, wherein M is an integer larger than 1−K and smaller than N−K.

7. The method for generating traffic of claim 6, wherein (b) includes determining the number N of nodes by counting received ID packets transmitted from each node coupled to the bus.

8. The method for generating traffic of claim 6, wherein the information of (c) is ID information on the nodes.

9. The method for generating traffic of claim 6, wherein the predetermined order of (c) is an ascending order of the node ID numbers.

10. The method for generating traffic of claim 6, wherein the predetermined order of (c) is a descending order of the node ID numbers.

11. A computer-readable recording medium having a program including instructions for generating traffic in a node, wherein a plurality of nodes are coupled to a bus and one node reads information on the other nodes and generates traffic, said instructions comprising:
    (a) detecting a bus reset;
    (b) determining a number N of nodes coupled to the bus and a node ID number K of the node; and
    (c) reading information on the other nodes in a predetermined order starting from a reference node having a node ID number K+M, wherein M is an integer larger than 1−K and smaller than N−K.

12. The computer-readable recording medium of claim 11, wherein (b) includes determining the number N of nodes by counting received ID packets transmitted from each node coupled to the bus.

13. The computer-readable recording medium of claim 11, wherein the information of (c) is ID information on the nodes.

14. The computer-readable recording medium of claim 11, wherein the predetermined order of (c) is an ascending order of the node ID numbers.

15. The computer-readable recording medium of claim 11, wherein the predetermined order of (c) is a descending order of the node ID numbers.

* * * * *